United States Patent

[11] 3,550,665

| [72] | Inventor | Henri Verdier |
| | | Puy-de-Dome, France |
| [21] | Appl. No. | 759,667 |
| [22] | Filed | Sept. 13, 1968 |
| [45] | Patented | Dec. 29, 1970 |
| [73] | Assignee | Compagnie Generale Des Etablissements Michelin, raison social Michelin & Cie, Clermont-Ferrand Puy-de-Dome, France |
| [32] | Priority | Sept. 18, 1967 |
| [33] | | France |
| [31] | | No. 121,403 |

[54] TIRE COVER
6 Claims, 3 Drawing Figs.

[52] U.S. Cl. ........................................................ 152/209,
[51] Int. Cl. ........................................................ B60c 11/00
[50] Field of Search ........................................... 152/209,
209D, 209S

[56] References Cited
UNITED STATES PATENTS
2,308,467  1/1943  Kovacs .................. 152/209
FOREIGN PATENTS
522,188  6/1940  Great Britain ........... 152/209S

*Primary Examiner* — Arthur L. LaPoint
*Attorney* — Brumbaugh, Graves, Donohue & Raymond ABSTRACT: A radial tire cover for a truck or the like has a tread formed in the center zone thereof with one or more continuous or discontinuous circumferential zigzag ridges separated by parallel circumferential zigzag grooves. The cover is characterized in that the edges of at least one ridge of this zone are notched by thin cutouts each having a length ranging from 0.1 to 1 times the width of the adjacent zigzag groove and preferably from one-fourth to one-third of such width.

PATENTED DEC29 1970   3,550,665

INVENTOR.
HENRI VERDIER
BY
Brumbaugh, Graves, Donohue & Raymond
his ATTORNEYS

TIRE COVER

BACKGROUND OF THE INVENTION

The present invention relates to improvements in the tread moldings of tire covers, especially the tread moldings of covers of the radial-carcass type, for heavy-duty vehicles.

Tires of the radial-carcass type for the aforementioned vehicles frequently have on their treads parallel zigzag grooves, often four in number and extending collectively over the entire periphery of the tread. These grooves, which are both simple and effective, are used especially for trucks. However, it has been found that this kind of tread molding under certain conditions is subject to a special kind of wear. After a period of travel on roads which are ordinarily not hard on tires, such as superhighways, there are formed, superimposed over the two center grooves, two furrows which are wider than these two grooves but of small depth. This typical wear starts by affecting the tips of the center ridge located between two grooves of the tread as well as the inner tips of the lateral ridges. It extends progressively in circumferential direction until two uninterrupted furrows are formed which blunt the tips of the ridge over a depth generally not exceeding 2 mm. Once this special type of wear is formed, it becomes stabilized in depth but grows in width and is superimposed on the general wear of the tread surface.

SUMMARY OF THE INVENTION

An important object of the invention is to lessen or eliminate the special type of wear described above.

The foregoing and other objects are attained in accordance with the invention by the provision of a tire cover the tread of which comprises, at least in its center zone, one or more circumferential continuous or discontinuous ridges running zigzag and separated by parallel grooves likewise running zigzag, the cover being characterized in that the edges of at least one ridge in this zone are cut by fine cutouts each having a length ranging from 0.1 to 1 times the width of the adjacent zigzag groove, preferably from one-third to one-fourth of such width.

Good results are obtained if the circumferential distance between two consecutive cutouts is less than the width of the adjacent groove. Preferably, the circumferential distance between two consecutive cutouts ranges from the width of the adjacent groove to the length of the cutouts.

The depth of the cutouts is substantially constant over their entire length and preferably equals the depth of the adjacent groove. The cutouts run crosswise or substantially crosswise, with a circumferential separation as indicated above. Their width may be close to 1 mm. and may range from 0.5 to 2 mm.

It has been found that by thus notching the edges of the ridges by thin cutouts in the center zone of the tread, one obtains a very appreciable decrease of the wear and tear in form of furrows without thereby bringing about a more pronounced wear and tear of the tread in its entirety or any loss in the road performance characteristics of the cover.

There is no indication opposing the cutting of the edges of all the ridges or other parts in relief of the tread in a similar manner as the ribs in the center part.

BRIEF DESCRIPTION OF THE DRAWING

An understanding of additional aspects of the invention may be gained from a consideration of the following detailed description of a representative embodiment thereof, taken in conjunction with the appended drawing, wherein.

DESCRIPTION OF THE PREFERRED EMBODIMENT

Figure 1:
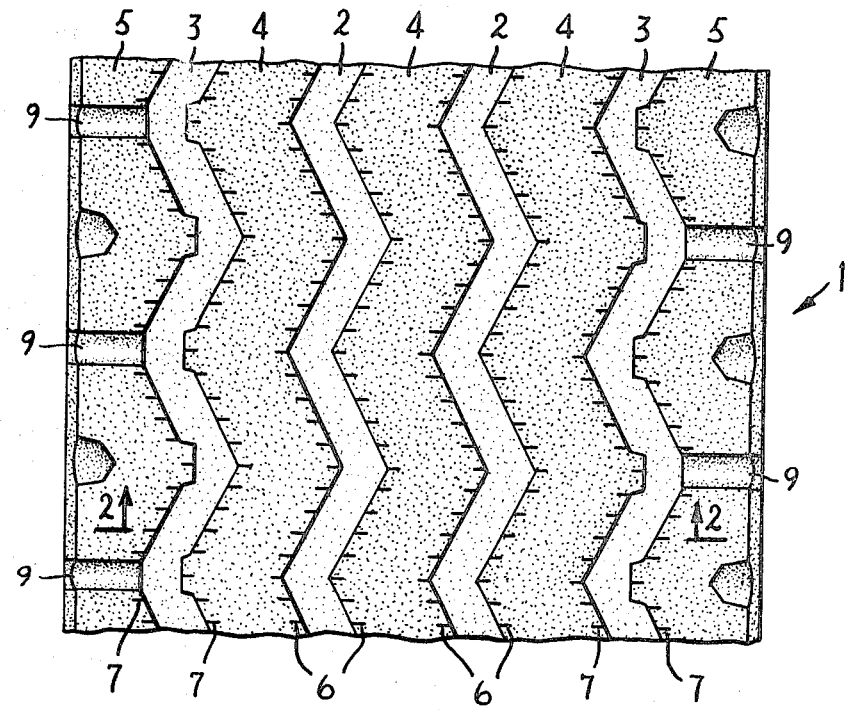
FIG. 1 is a plan view of a portion of the surface of the tread of a tire in accordance with the invention.
Figure 2:
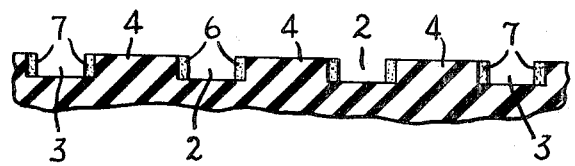
FIG. 2 is a sectional view along the line 2—2 of FIG. 1 and looking in the direction of the arrows.

FIGS. 1 and 2 show a tread 1 of a tire adapted for use on trucks and the like. Such tires are well known, an example being the E.20 X tire of Societe Michelin & Cie. The tread comprises two zigzag center grooves 2 which run parallel, two lateral grooves 3 identical to the preceding ones, three identical continuous zigzag ridges 4, and two lateral discontinuous ridges 5 having transverse grooves 9 therein forming the discontinuity. Any of the three ridges 4, or all of them, might be discontinuous and hence have transverse grooves therein corresponding to transverse grooves 9.

The edges of the ridges 4 which are adjacent to the center grooves 2 are notched by a multiple number of cutouts 6. The edges of the ridges 4 and 5 adjacent to the grooves 3 are likewise notched by similar cutouts 7. These cutouts 7 may however be absent.

The cutouts 6 and 7 have a width ranging around 0.5 mm.; they are separated from one another by approximately 6 mm. in a longitudinal direction; their length is approximately 3 mm., while the width of the grooves 2 and 3 is approximately 12 mm. measured perpendicularly to each zigzag segment. These cutouts 6 and 7 have the same depth as the grooves 2 and 3 and they thus extend over the entire thickness of the tread.

The scope of the invention is not exceeded if the cutouts 6 and 7 extend in a different direction, if the space separating them and their length are not uniform, or if the cutouts 6 and 7 are different in each edge of a ridge, the essential characteristic being that the edges of the ridges in the center zone subject to wear and tear in the form of furrows are rendered more mobile.

Figure 3:
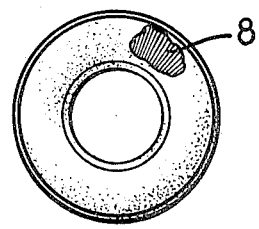
FIG. 3 is a schematic elevation, partly broken away, showing a radial-carcass tire, on which the tread of the invention is particularly adapted to be employed.

FIG. 3 shows radially extending cords 8 in the cover. The cords 8 extend from bead to bead, the cover being of the radial-carcass type, devoid of bias and cross plies. This is the type of cover the tread of which is particularly adapted to embody the present invention.

I claim:

1. A truck tire cover comprising radially-extending carcass cords therein and a tread formed in the center zone thereof with at least one circumferential zigzag ridge and at least two circumferential zigzag grooves on opposite sides of said ridge, said cover being characterized in that the edges of said ridge are notched by thin cutouts each having a length within the range of 0.1 to 1 times the width of the adjacent zigzag groove, the portions of said ridge between said edges being unnotched or less notched than said edges so that the edges of said ridge are rendered more flexible than the portions of said ridge between said edges.

2. A tire cover according to claim 1 wherein each of said cutouts has a length within the range of one-fourth to one-third the width of the adjacent zigzag groove.

3. A tire cover according to claim 1 wherein the circumferential distance between two consecutive cutouts ranges from the width of the adjacent zigzag groove to the length of said cutout.

4. A tire cover according to claim 1 wherein the depth of said cutouts is substantially constant over their entire length.

5. A tire cover according to claim 1 wherein the depth of said cutouts equals the depth of the adjacent zigzag groove.

6. A tire cover according to claim 1 further comprising two additional circumferential zigzag ridges respectively on the outer sides of said circumferential zigzag grooves, the edges of said additional ridges respectively adjacent to said grooves being notched by thin cutouts each having a length within the range of 0.1 to 1 times the width of the zigzag grooves respectively adjacent thereto.